United States Patent
Setheraman et al.

(10) Patent No.: US 7,694,078 B2
(45) Date of Patent: Apr. 6, 2010

(54) DATA PROCESSING APPARATUS THAT PROVIDES PARALLEL ACCESS TO MULTI-DIMENSIONAL ARRAY OF DATA VALUES

(75) Inventors: Ramanathan Setheraman, Eindhoven (NL); Aleksandar Beric, Eindhoven (NL); Carlos Antonio Alba Pinto, Eindhoven (NL); Harm Johannes Antonius Maria Peters, Eindhoven (NL); Patrick Peter Elizabeth Meuwissen, Eindhoven (NL); Srinivasan Balakrishnan, Eindhoven (NL); Gerard Veldman, Eindhoven (NL)

(73) Assignee: Silicon Hive B.V., Eindhoven (NL)

( * ) Notice: Subject to any disclaimer, the term of this patent is extended or adjusted under 35 U.S.C. 154(b) by 787 days.

(21) Appl. No.: 11/568,004

(22) PCT Filed: Apr. 21, 2005

(86) PCT No.: PCT/IB2005/051308

§ 371 (c)(1),
(2), (4) Date: Oct. 17, 2006

(87) PCT Pub. No.: WO2005/104027

PCT Pub. Date: Nov. 3, 2005

(65) Prior Publication Data

US 2008/0282038 A1    Nov. 13, 2008

(30) Foreign Application Priority Data

Apr. 22, 2004    (EP) ................................ 04101677

(51) Int. Cl.
*G06F 12/00* (2006.01)
(52) U.S. Cl. ...................................................... 711/133
(58) Field of Classification Search ....................... None
See application file for complete search history.

(56) References Cited

U.S. PATENT DOCUMENTS 6,161,576 A * 12/2000 Maher et al. ............ 137/565.23
6,378,046 B1 * 4/2002 Bellers et al. ................ 711/133

* cited by examiner

*Primary Examiner*—Hiep T Nguyen
(74) *Attorney, Agent, or Firm*—Leydig, Voit & Mayer Ltd.

(57) ABSTRACT

An array of data values, such as an image of pixel values, is stored in a main memory (12). A processing operation is performed using the pixel values. The processing operation defines time points of movement of a multidimensional region (20, 22) of locations in the image. Pixel values from inside and around the region are cached for processing. At least when a cache miss occurs for a pixel value from outside the region, cache replacement of data in cache locations (142) is performed. Locations that store pixel data for locations in the image outside the region (20, 22) are selected for replacement, selectively exempting from replacement cache locations (142) that store pixel data locations in the image inside the region. In embodiments, different types of cache structure are used for caching data values inside and outside the region. In an embodiment the cache locations for pixel data inside the regions support a higher level of output parallelism than the cache locations for pixel data around the region. In a further embodiment the cache for locations inside the region contains sets of banks, each set for a respective line from the image, data from the lines being distributed in a cyclically repeating fashion over the banks.

Figure 1:
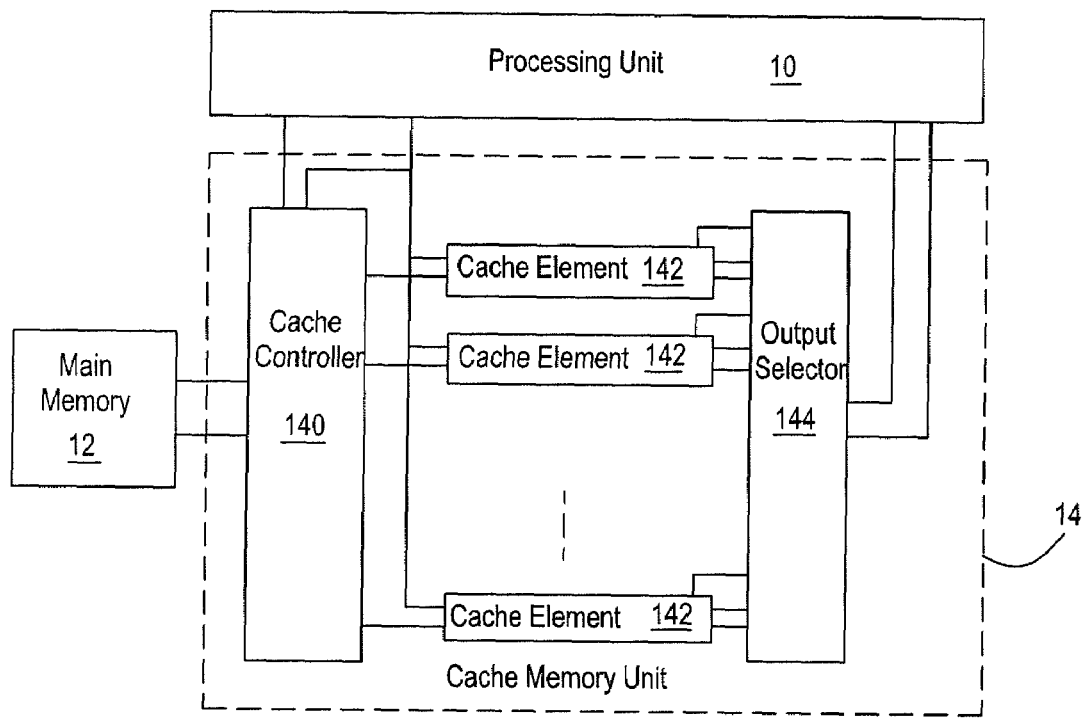

20 Claims, 4 Drawing Sheets

DATA PROCESSING APPARATUS THAT PROVIDES PARALLEL ACCESS TO MULTI-DIMENSIONAL ARRAY OF DATA VALUES The invention relates to a data processing apparatus and more particularly to a video data processing apparatus.

U.S. Pat. No. 5,530,481 describes an MPEG encoder. In MPEG some images are encoded as updates to adjacent images, by placing blocks of pixels vectors from the adjacent image at selected positions in the update images. MPED encoding involves the selection of motion vectors that describe distance and direction of displacement from the original positions of the blocks to the selected positions.

MPEG encoding typically involves a search for useful motion vectors, by comparing the pixel content of different blocks in the image that will be decoded by updating with the content of a block in the adjacent image. For this purpose an image memory is needed to store at least one of the images.

U.S. Pat. No. 5,530,481 describes how a buffer memory can be used to speed up the search for motion vectors. The buffer memory stores pixel data for a region of pixels that includes and surrounds the block that corresponds to a zero motion vector. Once a suitable motion vector has been selected a new region is processed, which typically overlaps most of the previous regions, to that only pixel data for a boundary part of the new region needs to be fetched into the buffer memory. Similar forms of region based access are needed for other image processing operations, such as pattern matching operations filtering etc.

U.S. Pat. No. 6,125,432 performs a similar motion vector estimation, using a cache memory for this purpose. Although not described in detail in this patent, a cache memory is well known to include cache memory locations that store data from a main memory m correspondence with addresses that may be used to fetch the data. The addresses for which data is stored in the cache memory locations can be changed. Typically, when a new address is addressed for which no data is stored in the cache memory, the data is fetched from a main memory and a cache memory location used for an old address is reused for the new address and corresponding data.

The performance characteristics of this type of image processing are significantly affected by the design of the memory for pixel data from the region. Using a large cache buffer memory, with capacity to store all the pixels of the region that may be needed during a search for a motion vector, and prefetching of all new pixels each time when the region changes, has the advantage that cache misses are avoided. The disadvantage of this approach is that a large buffer memory is needed, increasingly so when a larger search region is needed. An alternative is to use a small cache memory, wherein only part of the pixels from the region are stored, and other pixels are used to replace the cached pixels when these other pixels are addressed during the search for the motion vector. This alternative reduces the cache memory size, but it increases power consumption and delay due to cache misses.

Among others, it is an object of the invention to provide for an image processing apparatus, and more generally an apparatus for processing data that is organized in a two dimensional array, which supports more efficient cache use.

A data processing apparatus according to the invention is set forth in Claim 1. A data processing unit processes an array of data values and defines a sliding region of locations in the array. The region assumes successive positions in successive time intervals. During each time interval the processing unit uses data values from locations in and around the region that is assumed in that time interval. A cache memory unit is provided for caching data values. The cache memory unit has cache locations that are adaptively associated with addresses in the array of data that is processed. Cache management permits replacement of data to change the associated addresses. During each time interval different treatment is given to data values from the region that has been assumed in the time interval and to data values, from around that region. The cache locations that store data values from the region are exempted from cache replacement, whereas cache locations that store data values from around the region are subjected to cache replacement.

The cache size is generally smaller than necessary to cache data values from all locations that the processor needs from locations around the region during the time interval wherein that region is assumed. Hence, data values for locations around the region will generally be replaced during processing. Dependent on the sequence of addressing used by the processing unit it may even be necessary to reload data values for certain locations. In this way, efficient use is made of the cache locations: exemption of frequently used data values inside the region reduces cache misses and use of cache replacement outside the region reduces the required cache size.

Typically, the size of the region exceeds that of blocks (i.e. blocks and macro-blocks that contain a plurality of blocks) that the processing unit uses as a unit of access, for example during a search for matching macro-blocks for the purpose of motion vector estimation. In one example the region contains a central macro-block and half of adjacent macro blocks above and below and to the left and the right of the central macro block. Thus, a plurality of mutually overlapping macro-blocks fit in the region, each of which can be addressed without the risk of a cache miss, whereas macro-blocks further from the central macro-block may partially risk a cache miss and macro blocks that are even further entirely risk a cache miss. Preferably, the cache memory unit is arranged to output a plurality of data values from an addressed block (or more generally macro-block) in parallel. When an addressed block overlaps a region of the boundary part of the data values may be from exempted cache locations and part from non-exempted cache locations.

Preferably, data values from a predicted future region are prefetched into the exempted cache locations from main memory. More preferably, a prefetch buffer is provided for storing prefetched data values before copying to the exempted cache locations when the window moves.

Preferably, a predetermined set of cache locations is used to store data values for the current region. As a result, the design of these cache locations may be different from the design of the other cache location for locations outside the region, optimizing the design of cache locations for data inside the region using the knowledge that they are exempt from replacement, for example by using larger cache memory locations (for data values from more locations) for cache locations that store data within the region than for cache locations that store data outside the region.

In one embodiment, the cache memory that is used for the predetermined locations is arranged to produce data values for a first number of line segments, each for a different y-address in parallel. For the remaining cache elements another type of cache memory is used, that is capable of producing data values for no more than one line segment with one y-address or for no more than a second number of line segments with the second number of different y addresses, the second number being smaller than the first number. When a block of locations is addressed that is wholly within the window for which the data values are stored in the predetermined locations, the data processor switches to a first mode wherein data values from the first number of lines are accepted in parallel ("accepting" meaning for example compared to reference values in parallel, or otherwise processed in parallel). When the block extends beyond the boundary of the window, or lies wholly outside the window the processor switches to a second mode in which it accepts data values for one line in parallel only, or the second number of lines in parallel only. Thus, high parallelism is realized for the most frequently occurring blocks within the window and a lower level of parallelism is realized for blocks that are further afield.

In an embodiment, in order to realize high parallelism, the predetermined cache locations that store data from the central window may for example be organized as a plurality of sets of line units, each for a different line, or set of lines that is interleaved with the sets for other line units. In this embodiment each line unit may comprise a plurality of memory banks for outputting data values for a line in parallel, the number of banks being sufficient to output a number of data values in parallel, the number being equal to or exceeding the number of data values in a width Bx of an addressed block. In a further embodiment, the data values for W successive x-addresses may be distributed in cyclical fashion over the banks, so that data values from a line segment can be read in parallel at any x-position of the line segment wherein the line segments fits within the W positions. Preferably, each memory location of each memory bank is arranged to store a group of G data values for locations at successive x-positions (G=4 for example), the number S of banks in a line unit being so large that S*G exceeds the width Bx of the line segments of the block. This makes it possible to specify start addresses of the line segments within the groups, so that output of a specified line segment of Bx data values requires either Bx/G memory banks if Bx/G is integer, or the next higher integer above Bx/G. By using a sufficiently large number S of banks in a line unit, so that S*G>Bx, it is ensured that data values from sufficient groups can always be output in parallel from the memory banks. Preferably, a post selection of the data values from the memory banks it made to trim the output to data values for the line segments of the addressed block only. This type of cache memory may also be used by itself, i.e. not in combination with other types of cache memory, or even as a normal memory (not a cache memory). In this way a high level of parallelism can be realized, with little overhead if the accessed "window" (or region) moves in an array of data.

The other cache locations may be of a simpler design, which permits less parallelism. However, alternatively the entire image memory or image cache may be of this more complex design.

These and other objects and advantageous aspects of the invention will be described by means of non-limitative examples, using the following figures.

Figure 2A:
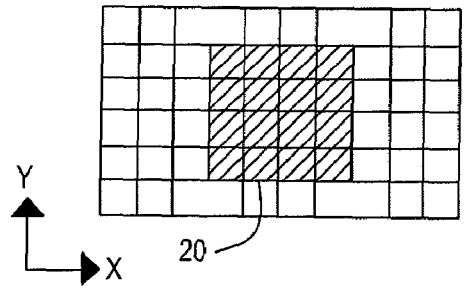
Figure 3:
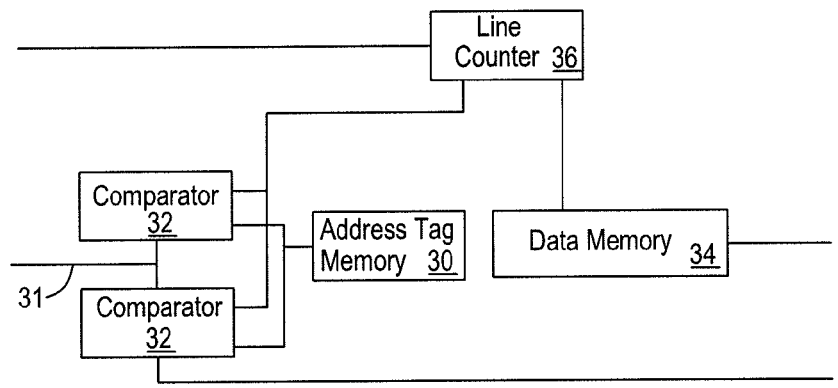
Figure 4:
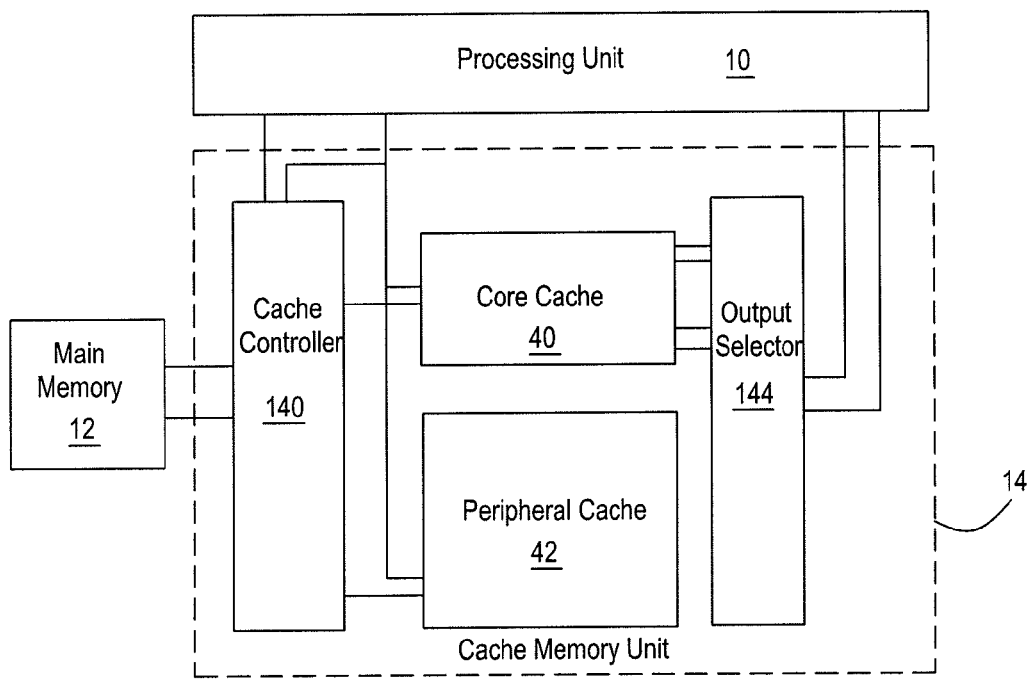
Figure 5:
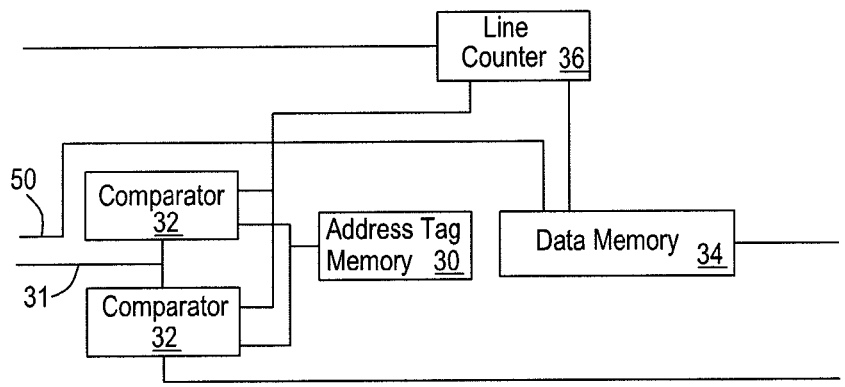
Figure 6:
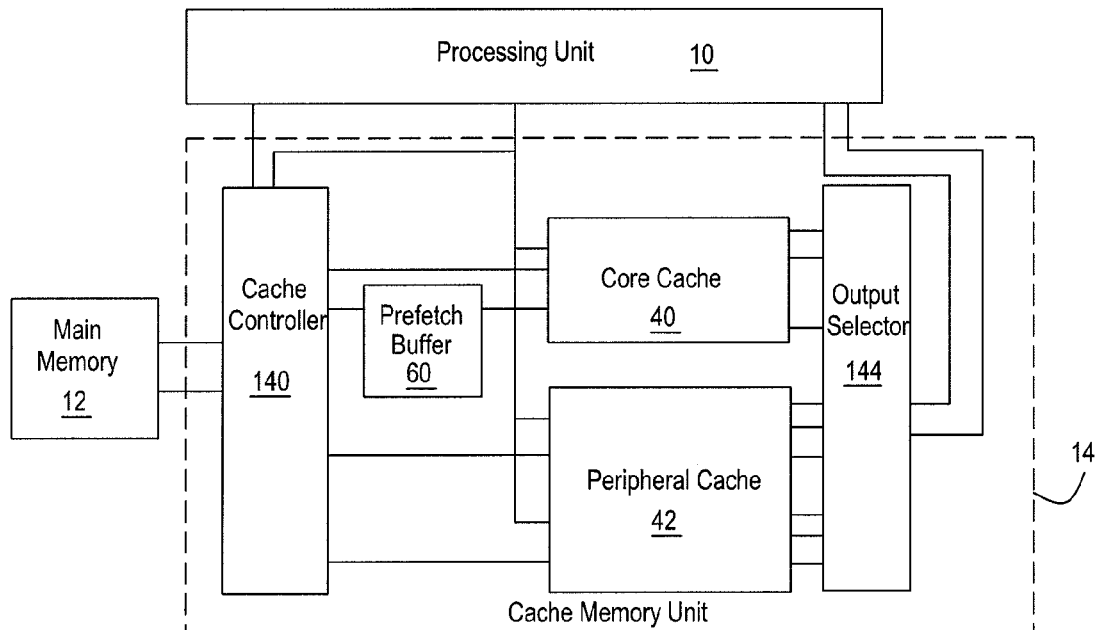
Figure 6A:
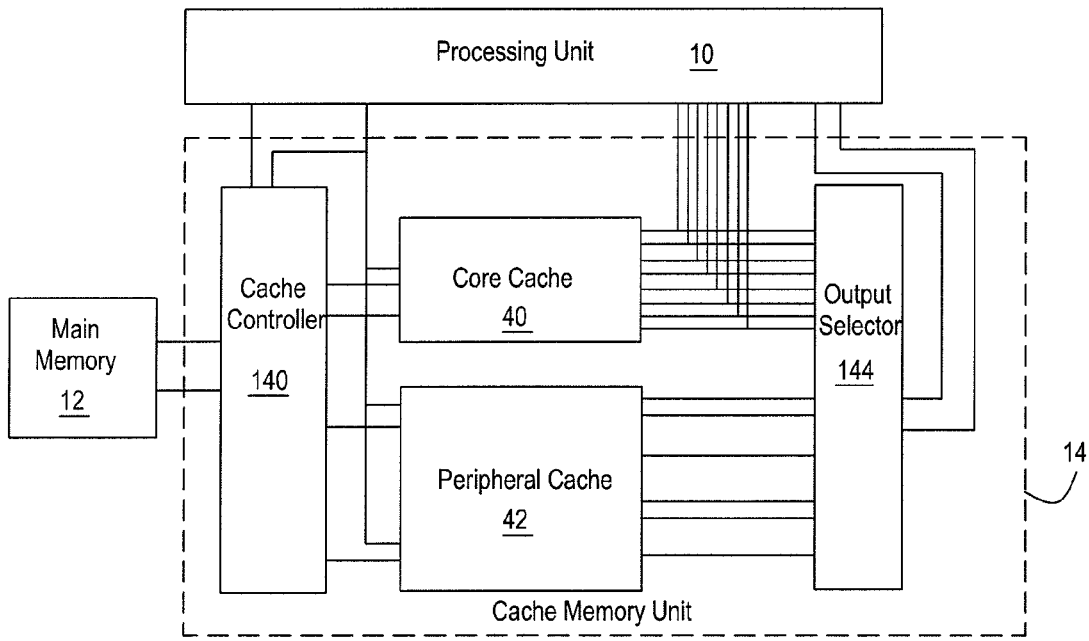
Figure 7:
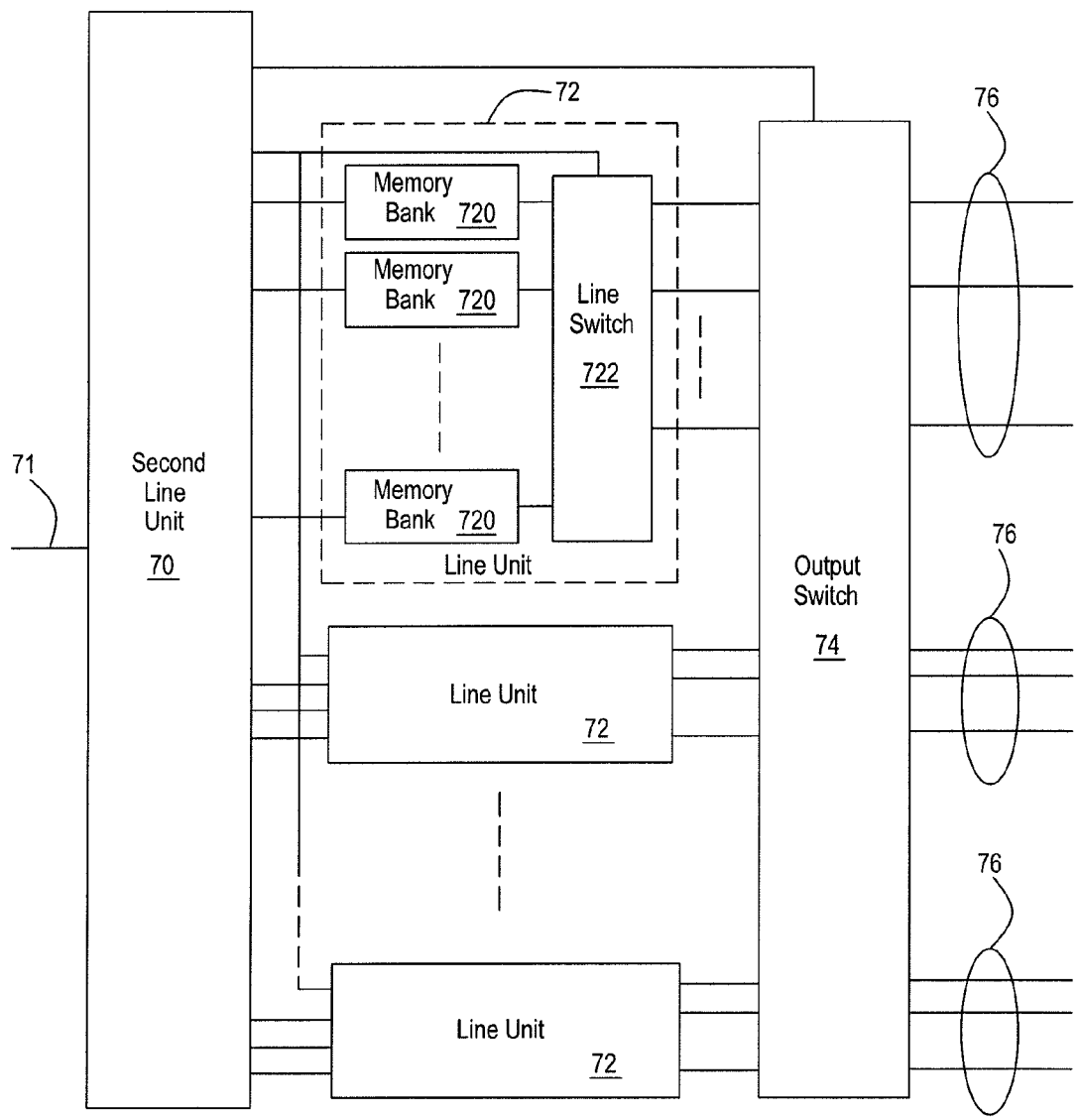

FIG. 1 shows an image processing apparatus
FIGS. 2a,b show part of an array of locations
FIG. 3 shows a cache element
FIG. 4 shows an image processing apparatus
FIG. 5 shows a cache element
FIG. 6 shows an image processing apparatus
FIG. 6a shows an image processing apparatus
FIG. 7 shows a memory structure FIG. 1 shows an image processing system, containing a processing unit 10, a main memory 12 and a cache memory unit 14. Processing unit 10 has an address output and data inputs coupled to cache memory until 4. Cache memory unit 14 has data and address connections to main memory 12. In operation processing unit 10 performs an image processing operation, that is, an operation that uses pixel data that is addressable by a combination of x and y addresses. Processing unit 10 supplies addresses that represent this type of combination to cache memory unit 14, which returns the addressed pixel data. When the addressed pixel data is stored in cache memory unit 14, cache memory unit 14 returns the data directly. Otherwise, cache memory unit 14 first fetches the pixel data in main memory 12.

FIG. 2a shows blocks in a region of an image. The region is ten blocks wide in the x direction and 6 blocks high in the y direction. Each block contains for example eight vertically successive rows of eight horizontally successive pixels. In one embodiment the unit of addressing is the block. In this embodiment the addresses need only contain combinations of x and y block addresses (omitting the three least significant bits from the x and y pixel addresses for example).

Cache memory 14 contains a number of cache elements 142 for respective cache locations, a cache controller 140 and an output selector 144. Each cache element 142 is arranged to cache pixel data for an x-y block, in association with an x-y pixel address, or an x-y block address of the cached block. Over time, different blocks are cached in a cache element 142, so that the associated x-y address changes. When processing unit 10 addresses a block of pixels or a pixel in such a block that is not stored in any of cache elements 142, cache memory unit 14 selects one of the cache elements 142 and replaces the block that is stored in that cache element 142 by the newly addressed block (after fetching that newly addressed block from main memory 12). The cache element 142 subsequently associates the x-y address of the newly fetched block with the cached data.

Cache controller 140 may be implemented as a small processor in its own right, with a memory that represents the xy-addresses of blocks that are stored in cache elements 142 and a program to manage cache elements 142. Cache controller 140 controls selection of the cache element 142 wherein newly fetched block is stored. Any selection algorithm may be used, such as for example LRU: replacing data in the least recently used cache element. However, cache controller 140 gives special treatment to cache elements 142 that store blocks of pixels with x-y addresses from a two-dimensional region of x-y addresses. This region, indicated by shaded area 20 in FIG. 2a extends over a plurality of rows of blocks and columns of blocks in the x and y direction respectively. This region 20 is selected by processing unit 10 and regularly updated during processing, for example moving the region to the right repeatedly (increasing the x address of the lowest blocks in the region) when processing unit 10 signals that the region should move.

Cache controller 140 exempts the cache elements 142 that cache blocks from region 20 from normal replacement (i.e. replacements that occur without movement of region 20). When a cache element 142 has to be selected to store a newly addressed block without movement of region 20, cache controller 140 selects this cache element 142 from a subset of the cache elements 142 that does not contain any of the exempted cache elements 142. Exemption during normal replacement may be realized in any convenient way, for example by storing blocks from region 20 in predetermined cache elements 142 that are exempted during cache replacement, by setting locking flags for cache elements 142 that store blocks from region 20, or by comparing the x-y addresses associated with respective cache elements 142 with the x-y address bounds of region 20.

When processing unit 10 signals to cache controller 140 that region 20 has to move in a certain direction (a predetermined direction or a direction selected and indicated by processing unit 10), cache controller 140 changes the set of blocks that is exempted from cache replacement. In the embodiment wherein predetermined cache elements 142 are exempted during normal replacement the change is realized by moving pixel data for the blocks that are contained in the new region but not in the old region into cache elements 142 that cached blocks that where contained in an old region but not in the new region. In case of a move in horizontal direction for example, this involves cache elements 142 that store a column of blocks with the same x address and different y addresses. In the embodiment wherein the cache elements 142 are exempted during normal replacement by means of locking flags, the locking flags are set for the for the blocks that are contained in the new region but not in the old region and cleared for cache elements 142 that cache blocks that where contained in the old region but not in the new region. In this embodiment the flags may be set when the relevant blocks are loaded into a cache element 142.

Preferably, cache controller 140 is arranged to prefetch blocks that will newly be included in region 20 when region 20 is moved. In the embodiments where the region is moved each time in a predetermined direction, cache controller 140 may start prefetching in response to a signal that triggers previous movement of the region. In the embodiment wherein processing unit 10 selects the direction processing unit 10 preferably first sends and cache controller 140 preferably first receives a direction signal to enable prefetching before transmission of the signal to move the region.

Figure 2B:
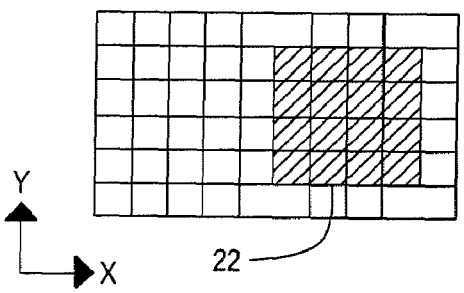

FIG. 2b illustrates prefetching. In the figure a shaded region 22 is shown, which is obtained by moving region 20 of FIG. 2a two blockwidths to the right. In this case, eight of the sixteen blocks in region 22 (those blocks that do not belong to the original region) have to be prefetched.

In the embodiment wherein predetermined cache elements 142 are exempted from replacement during normal replacement, these predetermined exempted cache elements 142 preferably include sufficient cache elements to store all blocks from a current region 20 plus additional cache elements 142 to store prefetched blocks, that is, twenty four blocks in the example of FIG. 2a. In the embodiment where locking flags are used cache controller 140 locks the prefetched blocks before the region is moved.

Preferably, cache memory unit 14 outputs pixel values for a plurality of pixel locations from a block (preferably all pixel values from a row in the block) in parallel to processing unit 10, and serially outputs successive other pluralities of pixels of the block (e.g. successive rows). Cache elements 142 are preferably arranged to cache blocks in their entirety, so that when a cache element 142 cache pixel data from a block the cache element 142 caches all pixel values from the block. In this case, one x-y block address may be used to identify a cache element 142 that caches all pixel values for the block. In response to one x-y block address, the cache elements 142 may then output pixel values for different x-addresses and one y-address from the block simultaneously in parallel, followed by output of pixel values for the same x-addresses but for successive other y-addresses.

In a further embodiment processing unit 10 uses macroblocks, that is, blocks that contain a plurality of blocks, e.g. a rectangle of n×m blocks, with n=m=2 for example. In this embodiment, a plurality of n cache elements 142, which store respective blocks in a macro block is preferably arranged to output pixel values in parallel. Typically, a macroblock is smaller than the size of region 20 or exempted blocks. For example, a 4×4 block region may be used and 2×2 block macroblocks.

FIG. 3 shows an example of an implementation of a cache element for this purpose. The cache element comprises an address tag memory 30, an address input 31, a plurality of address comparators 32 and a data memory 34. Furthermore, a line counter 36 is shown, which may be shared by a plurality of cache elements. In operation data memory 34 stores pixel data from a block. Address tag memory stores the x-y block address of the block from which data is stored. Processing unit 10 (not shown) applies an x-y address of a macroblock to address input 31. Comparators 32 are compare an x-y address from processing unit 10 (Dot shown) to the address from address tag memory 30, so that each comparator 32 tests whether address tag memory 30 contains a respective block in a row of blocks that is contained in the address macroblock. That is, a first comparator tests whether the address A=(Ax, Ay) from address tag memory 30 equals the address B=(Bx, By) of the macroblock from processing unit 10. A second comparator tests whether Ax equals Bx+d and Ay=By, where d is the x width of a block. When a macroblock contains n×m blocks, there are n comparators that tests whether Ax equals Bx+i*d where respective comparators test for respective integer i values from 0 to n−1.

Comparators 32 have outputs coupled to selector 144 (not shown). Selector 144 is arranged to output pixel data from the data memories 34 of n cache elements in parallel. Selector 144 has D outputs for this purpose. Each comparator 32 corresponds to a respective output and causes selector to output data from the data memory 34 at the corresponding output if the comparator 32 detects an address match. Line counter 36 is started by an addressing operation of processing unit 10 and count up y-addresses. Line counter 36 supplies these y addresses to data memory 34, causing data memory to output pixel data for successive lines of the block successively to processing unit 10, via selector 144 in response to a macroblock address.

If the height m of an n×m macroblock is greater than one, the y-address crosses a block boundary during counting. In this case line counter 36 preferably also has an output coupled to comparators 32 to supply a sub-macroblock part of the y-address of the blocks. When the line address crosses a block boundary different cache elements will thus be selected and pixel data from vertically successive blocks will be output via selector 144. It should be appreciated that during addressing of blocks in a macroblock addressing may cross from blocks that are exempt from normal replacement to blocks that are not exempt or vice versa. This may occur either within the lines of pixel data for a given y address value that are output simultaneously in parallel, or in the transition from one line with one y-address value to another. This may result in a cache miss, or a partial cache miss for a macroblock. When none of the comparators that correspond to an output of selector 144 responds, this is signalled to cache controller 140. This indicates that a block within a macroblock is not in cache memory. Cache controller 140 responds by fetching the relevant block from main memory 12, selection of a cache element 142 (cache elements that store blocks within the macroblock being exempted) and writing the pixel data of the block to the data memory 34 of the selected cache element 142 and its x-y block address the address tag memory 30 of that cache element 142. If need be, cache controller 140 fetches more than one block in this way. Cache controller 140 causes processing unit 10 to wait until all necessary blocks are available.

If prefetching is used for the locked blocks in the exempted region 20 then no cache miss will occur for those blocks.

However, even if the macroblock contains blocks from this region a cache miss may occur if the macroblock spans across the boundary of region 20.

In a further embodiment cache controller is arranged to pre-test whether blocks for higher y addresses within an addressed macroblock are available in cache elements. If not cache controller 140 optionally prefetches those blocks while pixel data from blocks for lower y-address values are being output to processing unit 10.

Advantageously, use is made of the knowledge that the blocks that are exempted from normal replacement are contiguous. (The cached blocks outside this region need not be contiguous). In one embodiment a predetermined set of cache elements 142 is used to store blocks from region 20.

FIG. 4 shows an embodiment wherein two cache memories 40, 42 are used for this purpose: a core cache 40 for blocks in the active region and a peripheral cache 42 for blocks outside the region. Since the blocks from the active region 20 are ensured to be kept in core cache 40 systematically, they may also be stored systematically. As a result the structure of core cache 40 can be simplified. One cache element per column of blocks in the active region 20 suffices, i.e. separate cache element for blocks with successive y values are not needed. If the region is h blocks high, the data memory 34 of the cache elements of core cache 40 contains h times less lines of pixel values for respective y-addresses within the core cache 40. This means that fewer address comparators are needed.

FIG. 5 shows a cache element for this purpose. In this embodiment address input has a part 50 for applying part of the block address part of a y-address from processing unit 10 as address to data memory 34 to select blocks within a single lines. Preferably, each line from region 20 is stored in data memory at a y-address corresponding to the least significant remainder of its y address modulo the number of lines in the data memory. That is, dependent on the position of region 20, lines that are at a given y-offset with respect to the top of the region may be stored in different memory location, always according to their absolute y-address.

The number of address comparisons can be reduced even further by using a predetermined cyclical assignment of columns of blocks from region 20 to cache elements 142. In this case only one comparison (to detect whether the macroblock overlaps the region) and a subtraction (to convert an x address of the block to an address of a cache element for a column in the cyclic assignment) is needed to determine which of the cache elements in core cache 40 should be used to address a block.

As has been noted, the use of a separate core cache 40 and peripheral cache 42 means that blocks from a new region have to be in the core cache 40 after processing unit 10 has signalled to move the region. The blocks may be copied from peripheral cache 42 as far as possible, but preferably all blocks from the new regions that are not yet in core cache 40 are fetched from main memory 12, irrespective of whether these blocks are in peripheral cache 42. Preferably, these blocks are prefetched. In this case, cache management unit 140 predicts what the next region 22 will be, or processing unit 10 signals in advance what the new region 22 will be, before actually signalling the move to the new region. In the case of a region that slides horizontally by predetermined steps, this prediction is simple, but of course more complicated movement patterns may be used.

FIG. 6 shows an embodiment wherein a prefetch buffer 60 is provided between core cache 40 and main memory 12 (through cache controller 140). In this embodiment cache controller is arranged to prefetch the new blocks in the predicted future region 22 from main memory 12 and to store these blocks into prefetch buffer 60. On receiving the signal to move the window from processing unit 10, cache controller 140 causes the prefetched blocks to be copied from prefetch buffer 60 to selected cache locations in core cache 40. This embodiment has the advantage that prefetching causes no interference with normal cache operations.

In another embodiment more cache locations are provided in core cache 40 than strictly necessary for region 20. In this embodiment the new blocks of the future region 22 are prefetched directly into cache locations that are not used for the current region 20. In an embodiment, cache controller 140 decouples the cache elements into which these blocks are prefetched from the rest of the core cache, so that writing into these cache elements can proceed independent of any reading by main processing unit 10.

When no prefetching is used, those blocks from the new region 20 that are in peripheral cache 42 are preferably moved to core cache 40 and the other blocks are fetched from main memory 12, optionally only once they are addressed by main processing unit 10.

In an embodiment core cache 40 and peripheral cache 42 may be arranged to supports different levels of parallelism during output of data values for a block of locations.

FIG. 6a shows an example of this type embodiment wherein core cache 40 is arranged to output data values for a plurality of line segments with different y-addresses in the block in parallel. In contrast peripheral cache 42 contains cache elements that allow one line segment to be addressed at a time. Core cache 40 has first outputs coupled to data processing unit 10 in parallel. The combination of core cache 40 and peripheral cache 42 is also coupled to processing unit 10.

In operation, when a block is addressed that lies completely within region 20, core cache outputs the data values for locations on lines of this block to processing unit in parallel. When a block is addressed that extends over the boundary of regions 20, or lies outside this region 20, data processing unit 10 switches to a mode wherein data processing unit accepts data values for one line of locations from the block at a time, the data values coming at least partly from peripheral cache 42 (accepting as used herein involves for example comparing the data values with reference values in parallel, or performing other processing operations in parallel). This has the advantage that high speed parallel processing can be used when blocks within core cache 40 are addressed, which occurs most of the time. When peripheral blocks are addressed a lower speed mode is used. Mode switching can be triggered by addressing unit 70 (FIG. 7), as a result of comparison of the block address with the cached region 20, or internally by processing unit 10 e.g. during a motion vector search if a far out motion vector is considered.

During image processing when the block is within region 20, processing unit 10 reads data values on a pixel-block basis. Each pixel-block contains a plurality of line segments, successive line segments having "By" successive y-addresses, and each line segment containing "Bx" locations with successive x-addresses. To speed up processing, image memory 14 is preferably arranged to output data values for a plurality of locations from an addressed block to processing unit 10 in parallel. Preferably, image memory is arranged to output all data values from the locations of a plurality of line segments with successive y addresses in parallel. This implies massively parallel access. For example, if 16×16 location blocks are used, and four lines have to be output in parallel, sixty-four data values have to be output in parallel.

FIG. 7 shows a memory architecture that supports this massive parallelism. The memory contains an addressing unit 70, a plurality of line units 72 and an output switch 74.

Addressing unit 70 has an address input 71 coupled to processing unit 10 (not shown). Output switch 74 has a plurality of line segment outputs 76, each for parallel output of Bx data values from locations that correspond to a line segment in a pixel block in the image. Each line unit 72 (only one shown in more detail) contains a plurality of memory banks 720 and a bank-switch 722. The banks 720 have address inputs coupled to addressing unit 70. Bank switch 722 has data inputs coupled to data outputs of the memory banks 720 and a control input coupled to addressing unit 70. Output switch 74 has data inputs coupled to data outputs of bank switches 722 of line units 72 and a control input coupled to addressing circuit 70.

Memory banks 720 each have a plurality of addressable locations and each location is arranged to store a plurality of G data values (G>1, e.g. G=4) for different pixel locations in the image. Each line unit 72 contains a plurality of S banks (S>1), so that the banks, together, output G*S data values for different pixels. Line switches 722 are arranged to output Bx (Bx=the number of pixel locations in a line segment) data values selected from the G*S data values from memory banks 720 (Bx<G*S), under control of addressing circuit. Output switch 74 is arranged to output the data values form line switches 722 to line segment outputs 76, addressing unit 70 controlling which line switch 722 is coupled to which line segment output 76. There are N line units 72 (N=4 for example). Typically the number of line units N equals the number of segment outputs 76.

During operation cache controller 140 writes data values to the memory banks 720 in the line units 72, or addressing unit 70 serves as cache management unit for this purpose. Writing occurs initially, or when the position of region 20 changes. In this case, addressing unit 70, acting as cache management unit, fetches new data values from main memory 12 and applies the fetched data values to selected memory banks 720 in selected line units 72, together with selected addresses for the memory banks 720.

Cache management by cache controller 140 or addressing unit 70 is organized so that each line unit 72 is stored in its memory banks 720 data values for locations with a respective y-address, or set of y-addresses that is unique to that line unit 72, so that data values for a number of successive y-addresses are stored in the combination of the line units. That is, for example, a first line unit 72 stores data values for locations with y addresses y, a second line unit 72 stores data values for locations with y addresses y+1 and so on. In the case wherein each line unit stores data values for a set of y-addresses, the sets are interleaved so that the distances between the y values within a set are the same for each set and equal to integer multiples of the number N of line units 72. For example, a first line unit 72 stores data values for locations with y addresses y, y+N, y+2N, etc, a second line unit 72 stores data values for locations with y-addresses y+1, y+N+1, y+2N+1, etc and so on.

For each y-address a line unit 72 stores data values for a plurality of locations with "w" successive x-addresses, wherein the number w of successive x addresses exceeds the line segment size Bx in a pixel block (w>Bx) and also the number G*S that the banks in a line unit 72 can output in parallel (w>G*S). Table I illustrates an example of assignment of data values with different x-addresses to memory banks 720 in a line unit 72. In the example the number S of memory banks 720 in the line unit 72 has been taken to be five (S=5) and the number G of data values in each location of a memory bank 720 has been taken to be four (G=4). The number w of successive x-addresses for which data values have been stored is taken to be thirty two (w=32) in the example. Each column in the table corresponds to a memory bank 720. Each field in the table (except the fields in the first row) represents the x-addresses stored in one memory location of a memory bank that corresponds to the column of the field.

TABLE I example of assignment of x-addresses to banks

| Bank 0 | Bank 1 | Bank 2 | Bank 3 | Bank 4 |
|---|---|---|---|---|
| x ... x + 3 | x + 3 ... x + 7 | x + 8 ... x + 11 | x + 12 ... x + 15 | x + 16 ... x + 19 |
| x + 20 ... x + 23 | x + 24 ... x + 27 | x + 28 ... x + 31 | | |

The assignment of x-addresses is not static. As processing unit 10 proceeds to the right along a line of the image during processing, data values for new x-addresses to the right of earlier addresses are loaded and stored in banks that previously stored data values at the left. Table II shows an example of how assignment of data values with different x-addresses to memory banks 720 evolves with time.

TABLE II example of evolved assignment of x-addresses to banks

| Bank 0 | Bank 1 | Bank 2 | Bank 3 | Bank 4 |
|---|---|---|---|---|
| x + 32 ... x + 35 | x + 36 ... x + 39 | x + 8 ... x + 11 | x + 12 ... x + 15 | x + 16 ... x + 19 |
| x + 20 ... x + 23 | x + 24 ... x + 27 | x + 28 ... x + 31 | | |

It should be noted that the data values for one memory location in Bank 0 (originally for x-addresses x, x+1, x+2, x+3) have been replaced by data values for new x-addresses (x-addresses x+32, x+33, x+34, x+35), that is for x-addresses that are w (w=32 in the example) higher than the original x addresses. The same goes for one memory location in Bank 1, but the other banks are unchanged. When processing advances along a line data values are replaced in bank 2 and 3, then in bank 4 and 0 and so on in a circular manner. At all times the memory locations in the banks that are occupied by data values remains the same, but the addresses of the pixel locations of the data values that are stored changes.

Table III illustrates an embodiment wherein data values from a set of a plurality of y-addresses are stored in each memory bank 720.

TABLE III example of assignment of x-addresses and y-addresses

| Bank 0 | Bank 1 | Bank 2 | Bank 3 | Bank 4 |
|---|---|---|---|---|
| x . . . x + 3, y | x + 3 . . . x + 7, y | . . . , y | . . . , y | . . . , y |
| . . . , y | . . . , y | . . . , y | x . . . x + 3, y + N | . . . , y + N |
| . . . , y + N | . . . , y + N | . . . , y + N | . . . , y + N | . . . , y + N |
| . . . , y + N | x . . . x + 3, y + 2N | . . . , y + 2N | . . . , y + 2N | . . . , y + 2N |
| . . . , y + 2N | . . . , y + 2N | . . . , y + 2N | . . . , y + 2N | x . . . x + 3, y + 3N |
| . . . , y + 3N | . . . , y + 3N | . . . | . . . | . . . |
| . . . | . . . | . . . | . . . | . . . |

It should be noted that Bank 0 stores data values for y addresses y, y+N, y+2N and so on. Bank 1 stores data values for y-addresses y+1, y+N+1, y+2N+1 and so on. For each y-address data values for successive different x-addresses are circularly distributed over the memory banks 720 as shown in the previous tables.

As in the case of tables I and II the addresses of the data values in the memory locations are not static. This illustrated in table IV.

TABLE IV example of evolution of assignment of x-addresses

| Bank 0 | Bank 1 | Bank 2 | Bank 3 | Bank 4 |
|---|---|---|---|---|
| x + 32 . . . x + 35, y | x + 36 . . . x + 39, y | x + 8 . . . x + 11, y | . . . , y | . . . , y |
| . . . , y | . . . , y | . . . , y | x + 32 . . . x + 35, y + N | x + 36 . . . x + 39, y + N |
| x + 8 . . . x + 11, y + N | . . . , y + N | . . . , y + N | . . . , y + N | . . . , y + N |
| . . . , y + N | x + 32 . . . x + 35, y + 2N | x + 36 . . . x + 39, y + 2N | x + 9 . . . x + 11, y + 2N | . . . , y + 2N |
| . . . , y + 2N | . . . , y + 2N | . . . , y + 2N | . . . , y + 2N | x + 32 . . . x + 35, y + 3N |
| x + 36 . . . x + 40, y + 3N | x + 8 . . . x + 11, y + 3N | . . . | . . . | . . . |
| . . . | . . . | . . . | . . . | . . . |

It should be noted that in this embodiment the set of locations that is used for data values with a given y-address remains the same: each data values for a location with a certain x-addresses and y addresses replaces a data values with the same y-address and the x address x−w. Moreover, as shown in the embodiment of tables III and IV there are no gaps between sets of data values for locations with different Y addresses. In the embodiment the memory bank 720 wherein a data value for the location with xy address x,y+N is stored in the location that would be occupied by the data value for the location with xy address x+w,y if data values for a larger number of x addresses would be in the memory banks 720 simultaneously.

It should be appreciated that this storage scheme is designed to facilitate a combination of massively parallel access and rolling replacement of data values for a window of pixel locations. When the window moves the data values for pixel location that come to fall outside the window are replaced by data values for pixel locations that that have come to fall inside the window.

Addressing unit 70 ensures that data values from a block of pixel locations in the image are output in parallel to processing unit 10 (not shown). Upon receiving an xy-address of a block, addressing unit 70 computes intra-memory bank addresses from which data values for line segments in the block will be read from different memory banks 720. Addressing unit 70 applies these addresses to memory banks 720. Furthermore, addressing unit 70 computes which of the memory banks 720 stores data values from which position in the line segment in the block. Addressing unit 70 supplies corresponding control signals to line switches 722 to ensure that each part of the output of line switches 722 outputs a data values for a location at a respective predetermined x-offset relative to the received xy-address of the block. Finally, addressing unit 70 computes which of the line units 72 outputs which line segment Addressing unit 70 supplies corresponding control signals to output switch 74 to ensure that each segment output 76 outputs data values for a line segment at a respective predetermined y-offset relative to the received xy-address of the block.

A more detailed example of an embodiment of addressing will be described. In this example, the xy-address supplied to addressing unit 70 will be denoted by Ax Ay, where Ax is the x-address part and Ay is the y address part. In this embodiment, the memory stores data values for a window of pixel locations starting from a window corner address Wx,Wy, and running over a number w of pixel location a horizontally. Addressing unit 70 maintains an offset counter values B,M, which are indicative of the bank B and memory location M in that memory bank 720 where the data value for the corner address of the window is stored. Furthermore addressing unit represents information about D, the offset between addresses Z of memory locations in memory banks 720 that store data values from leftmost location in successive lines in the window (herein Z are compound addresses Z=q+r*S, whereon q is a sequence number of the memory bank 720 that contains a memory location and r is the address in that bank). In the example of table II and IV D=8.

From this information addressing unit 20 computes (a) the position I within a memory location in a memory bank 720 wherein the data value for the upper left corner of the addressed block is stored, (b) the sequence number C of the bank wherein the data value for the upper left corner of the addressed block is stored and (c) the address R within the memory bank 720 wherein the data value for the upper left corner of the addressed block is stored. Is, C and R can be expressed in terms of a position value P that is indicative of the memory bank 720 and address within that memory bank 720 wherein the data value for the upper left corner of the addressed block is stored:

$$P=B+Ax-Wx+D*(Ay-Wy)$$

The position value P can be used to define the position I within a memory location in a memory bank 720, according to $$I=P \bmod G$$

(Herein "mod" denoted the modulo function, i.e. the remainder of P after division by G). Similarly, the sequence number C of the memory bank 720 can be defined according to $$C=[(P-I)/G] \bmod S$$

The address R within the memory bank 720 can be defined according to $$R=[(P-C*G-I)/(S*G)]$$

Addressing unit 70 uses this information as follows. In each line unit 72 addressing unit normally addresses the memory banks 720 with sequence numbers higher than and equal to C with the address R, and the memory banks with lower sequence number than C (if any) with address R+1. Addressing unit controls line switches 722 to rotate the assignment of data values from input to output by G*C+I. That is, if the outputs are assigned sequence numbers j=0, 1, ... Bx−1, then line switch 722 makes its output with sequence number j output the data value from a position K within a memory bank 720 according to $$K=(I+j) \bmod G$$

the memory bank 720 from which the data value is selected by means of a sequence number L according to $$L=(I+j-K)/G$$

Finally, addressing unit 70 controls output switch 74 to determine which line unit 72 is coupled to which line segment output 76. If the line segment outputs 76 are assigned sequence numbers i=0, 1, ... N−1 and line units 72 are assigned sequence numbers i'=0 ... N−1, then output switch 722 makes its line segment output with sequence number i output the line segment from line unit 72 with sequence number i' according to $$i'=[i+Ay-Wy] \bmod N$$

If the number N of segments outputs 76 is at least equal to the vertical block size By (N≧By) then all data values of a block of locations will be output in parallel. If the vertical block size is larger (By>N) then a number of successive temporal cycles is needed to output the data values for successive parts of the block in series. In this case addressing unit 70 responds to an address by reading from successive sub-blocks, effectively outputting sub-blocks of N*Bx locations, the successive sub-blocks starting at xy-addresses (Ax,Ay), (Ax,Ay+N), (Ax, Ay+2N) etc.

By now it will be appreciated that the architecture of the memory makes it possible to output a massive number of data values from a two-dimensional block of pixel locations in an image in parallel in response to a block address, and at the same time to accommodate for the storage of data values from a sliding window of pixel locations without excessive loading of data values when the window slides. The block addresses can be located at any pixel position.

Important points to note are that there are at least as many line units 72 (N line units) as there are line segments from which data values are output in parallel. As a result data values from N line segments with different y-addresses may be output in parallel.

Each line unit contains at least one more memory bank 720 than strictly necessary for outputting the number of data values from a line segment that are output in parallel ((S+1)*G≧Bx). This makes it possible to start the line segments at any pixel location, not just at locations with x-addresses that are an integer multiple of the number G of data values in each memory location of the memory banks 720. If the starting x-address of a line segment is such an integer multiple, only Bx/G of these memory banks 720 need to be read in a line unit 72, but if the addresses are not aligned 1+Bx/G memory banks 720 need to be read in a line unit 72, the data values from two of these memory banks 720 being only partially output to processing unit 10.

Each line unit 72 preferably stores data values from its own a set of lines with y-addresses that are N (the number of line units 72) addresses apart, successive line units storing data values from successive-intermediate lines. This makes it possible to retrieve blocks with arbitrary y-address values Wy, not just a fixed y-address value or a multiple of some base distance.

Although an embodiment of the image memory has been described it should be noted that many alternatives are possible. For example, in one embodiment there may be gaps between data values for different line segments in a memory bank. In other words, although in the example the offset D equaled w, the number of x-addresses in the window for which data values are stored, it may be that D>w in some embodiments. As another example, the line segments for different y-addresses may be stored in an arbitrary locations of memory banks 720, any address translation mechanism (e.g. of the type used in cache memories) being used to address the desired locations.

As another example, although in the embodiment the number M of locations in each line segment for which data values are output in parallel equals the horizontal block size Bx, it will be appreciated that in other embodiments this number M may be smaller than Bx((S+1)*G≧M), only part of a line segment in a block being output in parallel. In this case a smaller number S of banks may be used in each line unit 72, but of course a plurality of line segment parts has to be output in series if processing unit 10 needs data values from an entire block.

As yet another example, groups of line S' units 72 may be used for the same y-address values, each storing data values for a successive segment of x-addresses, so that the successive segments together form a larger segment. The structure of such an embodiment is similar to that of FIG. 7. The difference is that the memory banks 720 in a line unit are organized into groups and that the bank sequence numbers wrap around in each group with a In this case, a further output switch may be added to compose data values for line segments that extend over the locations from different groups. Table V illustrates this

TABLE V example of assignment of x-addresses to groups of banks

| Group 1 | | | Group 2 | | |
|---|---|---|---|---|---|
| Bank 0 | Bank 1 | Bank 2 | Bank 0 | Bank 1 | Bank 2 |
| x ... x + 3 | x + 3 ... x + 7 | x + 8 ... x + 11 | x + 20 ... x + 23 | x + 24 ... x + 27 | x + 28 ... x + 31 |
| x + 12 ... x + 15 | x + 16 ... x + 19 | ... | x + 32 ... x + 35 | x + 36 ... x + 39 | ... |

Although for the sake of clarity small groups and a small number of groups has been used, it will be appreciates that in practice more and larger groups may be used. In this embodiment, line switches 722 are arranged to combine data values from various groups, e.g. from two groups into a line segment that spans locations with a range of x-addresses that spans across groups, dependent on the block address.

As an alternative, this may be implemented by providing a plurality of memory units as shown in FIG. 7 in parallel, and by inserting a further switch between output switch 74 and processing unit 10. In this embodiment each memory unit stores data values for a range of x-addresses (ranges (x . . . x+w−1), (x+w . . . x+2w−1), . . . etc.). The further switch combines data values from different memory units into data values for line segments of successive x-addresses from the outputs of different memory units.

Furthermore, although an embodiment has been described where data values fro locations with different x-addresses and a specific y-address continue to occupy the same set of memory locations in memory banks 720, in another embodiment the memory locations for different y-addresses may roll around. This is illustrated in table VI, which evolves from table III, but with a different addressing scheme compared to table IV.

As can be seen by comparing with table III the data values for new x-addresses for the final line segment (H lines down with y-address y+H) are now stored in the first memory location in the first two memory banks. The data values for the new x-addresses for the first line segment (y-address y) are stored at the locations that were used for the old x-addresses for the next line (y-address y+1) and so on.

It will be appreciated that in this embodiment a different method is needed for calculating the addresses of locations within the banks and the sequence number of the bank that contains the first x-address of an address block.

Furthermore, although the example has been described for movements of the window in steps of eight pixel locations in the positive x-direction, it will be appreciated that movements of any size and in any direction and may be used. For example, larger steps or smaller steps in the positive x-direction merely require overwriting data values in more or fewer memory banks 720. Steps in the negative x-direction require

TABLE VI example of evolution of assignment of x-addresses

| Bank 0 | Bank 1 | Bank 2 | Bank 3 | Bank 4 |
|---|---|---|---|---|
| x + 32 ... x + 35, y + H * N | x + 36 ... x + 39, y + H * N | x + 8 ... x + 11, y | ..., y | ..., y |
| ..., y | ..., y | ..., y | x + 32 ... x + 35, y | x + 36 ... x + 39, y |
| x + 8 ... x + 11, y + N | ..., y + N | ..., y + N | ..., y + N | ..., y + N |
| ..., y + N | x + 32 ... x + 35, y + N | x + 36 ... x + 39, y + N | x + 9 ... x + 11, y + 2N | ..., y + 2N |
| ..., y + 2N | ..., y + 2N | ..., y + 2N | ..., y + 2N | x + 32 ... x + 35, y + 2N |
| x + 36 ... x + 40, y + 2N | x + 8 ... x + 11, y + 3N | ... | ... | ... |
| ... | ... | ... | ... | ... | replacement of data values for the final locations, as illustrated in table VI

TABLE VII example of evolution of assignment of x-addresses to banks

| Bank 0 | Bank 1 | Bank 2 | Bank 3 | Bank 4 |
|---|---|---|---|---|
| x ... x + 3 | x + 3 ... x + 7 | x + 8 ... x + 11 | x + 12 ... x + 15 | x + 16 ... x + 19 |
| x + 20 ... x + 23 | x − 8 ... x − 5 | x − 4 ... x − 1 | | |

Movements steps of the window in the y direction involves replacement of data for obsolete y-addresses. In the case of a step of one line in the positive y direction, this involves replacement in the memory banks 720 of a single line unit 72 that stores data values for the lowest y value by data values.

Table VIII illustrates this type of replacement for an example of movement in the y direction. In this example, the number H is the number of lines that in the window that is stored in the memory banks.

TABLE VIII example of evolution after a step in the y direction

| Bank 0 | Bank 1 | Bank 2 | Bank 3 | Bank 4 |
|---|---|---|---|---|
| x ... x + 3, y + H * N | x + 3 ... x + 7, y + H * N | ..., y + H * N | ..., y + H * N | ..., y + H * N |
| ..., y + H * N | ..., y + H * N | ..., y + H * N | x ... x + 3, y + N | ..., y + N |
| ..., y + N | ..., y + N | ..., y + N | ..., y + N | ..., y + N |
| ..., y + N | x ... x + 3, y + 2N | ..., y + 2N | ..., y + 2N | ..., y + 2N |
| ..., y + 2N | ..., y + 2N | ..., y + 2N | ..., y + 2N | x ... x + 3, y + 3N |
| ..., y + 3N | ..., y + 3N | ... | ... | ... |
| ... | ... | | | |

For larger steps data values for obsolete y-addresses are replaced in more line units 72. The possible movement steps are not limited to steps in the x and y direction. Oblique steps, can be realized as combinations of x and y steps.

The data values are typically fetched from a main memory 12 (not shown) that stores the entire image. For this purpose line units may be provided with connections to main memory to fetch the relevant data values given the addresses of the line segment that need to be stored in the line units. In an embodiment the main memory is also organized in units that each store lines for a respective set of y-addresses that are N lines apart. In this case, each line unit 72 may be coupled to a respective unit of the main memory.

It should be appreciated that the image memory of FIG. 7 may be combined with the cache structure of FIG. 1 in various ways. The simplest implementation the memory unit of FIG. 7 is used for as core cache for region 20 and any type of peripheral cache memory for the locations that surround region 20, not necessarily of the type shown in FIG. 7. If this peripheral cache memory is of a type that is not capable of outputting data values for multiple line segments in parallel, the performance of the core cache is simply downgraded by using one line at a time from the core cache if the addresses block spans both locations in the core cache and the peripheral cache.

In another embodiment addresses within the banks may be associated with adaptable x and/or y addresses. In this embodiment, the memory unit (eg. addressing unit 70 or memory banks 720) use each received address to test whether and if so at which associated address a data value or data values for that address are stored in memory banks 720. In case of a miss the data values are fetched from main memory 12, otherwise the data value or data values are fetched from the associated address. This may be applied for example to the y-address part of data only, independently for different line units 72 or even independently for different memory banks 720 within the same line unit 72. It should be noted that in this case there may be gaps larger than between the y-addresses of line segments that are stored in line units 72. Typically, the gaps will be an integer multiples of N, but other gaps may be used as well. This type of caching may also be applied to the x-addresses, so that different locations in memory banks 720 store data values for different line segments (different ranges of x-addresses).

In another embodiment a number of memory structures as shown in FIG. 7 is used in parallel, as cache elements, followed by a further output switch to piece together line segments from signals from different ones of the memory structures. In this embodiment, the memory structures may be associated with respective sub-windows in the image, using an associative mapping technique that is conventional for cache memories. When a block is addressed, those memory structures that store relevant data are activated and the data values for the block are output in parallel from the activated memory structures.

When a block is addressed that contains data values that are not in this plurality of memory structures, the missing data values are fetched from main memory 12 and stored in one of the structures, replacing earlier data values. In this embodiment selected memory structures that store data values from active region 20 are preferably exempted from replacement.

In another embodiment all cache elements of FIG. 1 are implemented as respective line units 72. In this embodiment line units a data value distribution scheme of the type illustrated with table V may be used, and line units 72 may be associatively assigned to groups of line units that have their outputs connected to common line switches 722. Preferably, a first sub-set of the line units 72 stores all data values for the active region 20 and a second sub-set of the line units 72 store data values for selected sub-windows around the active region 20. The addresses of the sub-windows in the second sub-set are subject to replacement, as described in the context of FIG. 1. As a result, the sub-windows stored in different line-units have no predetermined spatial relationship.

The invention claimed is:

1. A data processing apparatus for processing an at least two dimensional array of data values, the apparatus comprising a main memory (12) for storing data values from the array;

a processing unit (10) arranged to signal region movement of a sliding region (20, 22) in the array, and, between signalling of region movements, to output addresses indicative of locations in the array, the sliding region (20, 22) extending along at least two dimensions in the array over pluralities of separately addressable locations;

a cache memory unit (14) coupled between the processing unit (10) and the main memory (12), the cache memory unit (14) comprising a plurality of cache locations (142) for caching data values addressed by addresses that are adaptively associated with the cache locations, the cache memory unit (14) being arranged to apply cache replacement, changing the associated addresses and corresponding cached data in case of a cache miss, and to selectively exempt from replacement cache locations that store data values for locations in the sliding region (20, 22) that applies at the time of addressing.

2. A data processing apparatus according to claim 1, wherein the cache memory unit (14) is arranged to exempt a predetermined subset of cache locations (40) from replacement, the cache memory unit (14) being arranged to store data values for locations in the sliding window (20, 22) in the predetermined subset.

3. A data processing apparatus according to claim 2, comprising a prefetch unit (140) for prefetching data values of a predicted future region (22) into the cache locations of the predetermined subset (40).

4. A data processing apparatus according to claim 3, wherein the prefetch unit (140) is arranged to prefetch the data values of the predicted future region (22) from the main memory (12), the prefetch unit (140) comprising a buffer memory (60) for buffering the prefetched data units until the processing unit (12) signals movement of the sliding window (20, 22).

5. A data processing apparatus according to claim 2, wherein a size of the cache locations (142) that are adaptively associated with respective addresses in said predetermined subset (40) is larger than a size of the cache locations from a remainder (42) of the cache memory locations (142) outside the predetermined subset.

6. A data processing apparatus according to claim 2, wherein the cache locations (142) in said predetermined subset (40) are arranged to output data values from a plurality of a first number of lines of the array to the processing unit (10) in parallel in response to an address of a block of location in the array, the cache locations (142) from a remainder (42) of the cache memory locations (142) outside the predetermined subset (40) being arranged to output data values from a single line at a time in response to the address of the block, or in parallel from a second number of lines, the second number being smaller than the first number, the processing unit (10) being arranged to switch between a first mode in which the processing unit inputs data values from a plurality of the first number of lines in parallel and a second mode in which the processing unit inputs data values from a single line or said second number of lines in parallel, dependent on whether the addressed block lies within the region (20,22) or not.

7. A data processing apparatus according to claim 1, wherein the cache memory unit (14) comprises address locations (30) for storing address items associated with respective cache locations, each address item specifying at least two dimensions of a location in the array, the cache memory unit (14) being arranged to address the cache locations (142) associatively by comparing addresses with the address items, each cache location (142) being arranged to store data values for a block of locations associated with the address item, each block containing a first line segment of successive locations along a first dimension of the array, and second line segments of locations along a second dimension of the array, each second line segment containing a respective location from the first line segment.

8. A data processing apparatus according to claim 7, wherein the processing unit (10) is arranged to issue a macro-block address of a macro-block that contains a plurality of blocks, the cache memory unit (14) being arranged to output data values from locations in the plurality of blocks in parallel in response to the macro-block address, from respective cache locations (142) that store the blocks from the addressed macro-block, the cache memory unit (14) managing cache replacement of the respective cache locations below macro-block granularity, at block granularity.

9. A data processing apparatus according to claim 1, wherein the processing unit (10) is arranged to issue a block address of a block of locations in the array, the cache memory unit (14) being arranged to output data values for a set of locations in the block in response to the block address, the cache memory unit (14) being arranged to accept addresses so that the set of locations extends across a boundary of the region (20, 22).

10. A data processing apparatus according to claim 1, wherein the cache memory unit (14) is arranged to output the data values from the set of locations that extends across a boundary of the region (20, 22) simultaneously in parallel in response to the block address.

11. A data processing apparatus according to claim 10, wherein the cache memory unit (14) is arranged to output data values for locations within the region (20, 22) in series with data values outside both in response to a same reception of the block address.

12. A data processing apparatus according to claim 10, wherein the processing unit (10) is programmed to perform motion vector searches in an image processing operation, by comparing sets of data values fetched from the cache memory unit (14) with a reference set of data values.

13. A data processing apparatus according to claim 10, wherein a size of the region (20, 22) is larger than a size of the blocks along at least one of the dimensions of the array.

14. An image processing method, the method comprising the steps of storing an image of pixel values in a main memory (12);
performing a processing operation using the pixel values, the processing operation defining time points of movement of a region (20, 22) of locations in the image, the region extending along two dimensions in the image over pluralities of separately addressable pixel locations, the processing operation accessing pixel values from inside and outside the region that applies at a time of access;
caching pixel values, from inside and outside the region (20, 22) that applies at the time of caching;
managing cache replacement, at least upon a cache miss for a pixel value from outside the region, to allow replacement of data in cache locations (142) that store pixel data for locations in the image outside the region (20, 22), selectively exempting from replacement cache locations (142) that store pixel data locations in the image inside the region that applies at the time of the replacement.

15. An image processing method according to claim 14, wherein two dimensional blocks of locations are addressed at a time, the region (20, 22) having a size larger than a size of one of the blocks.

16. A method of parallel retrieval of data values for a block of locations in a multi-dimensional array of locations, the block and the array extending for pluralities of locations in a first and second dimension, the method comprising defining a window (20,22) of locations in the array, the window containing line segments that contain W successive locations extending along the first dimension;
providing a plurality of line units (72), each containing a plurality of S memory banks (720), each memory bank (720) having addressable locations, each for storing data values for a respective plurality of G locations that are successive in the first dimension, the product S*G being smaller than the number W of successive locations in the window (20, 22);
storing data values from line segments in the window (20, 22) in the memory banks (720), data values for respective line segments that are successive in the second dimension being stored in respective ones of the line units (72), the data values for successive groups of G locations in each line segment being stored cyclically distributed in cycles of S groups over the S memory banks (720) of the line unit (72) in which the data values for the line segment are stored;

receiving a two-dimensional address of the block;

addressing a plurality of line units (72) in parallel to output data values for different successive line segments in parallel, a plurality of memory banks (720) that store data values being addressed in parallel within the line segments, selecting the data values for the line segments from the data values output by the addressed memory banks (720).

17. A method according to claim 16, comprising routing data values from the addressed memory banks (720) to respective outputs, dependent on the address of the block relative to a starting address in the memory banks (720) wherein data values for the line segment are stored, so that each output outputs a data value for a location with a predetermined offset with respect to a first dimension of the address of the block, and routing data values from respective line units (72) to the respective outputs, dependent on the address of the block relative to a sequence number of a line unit (72) wherein data values with a lowest address in the second dimension are stored, so that each output outputs a data value for a location with a predetermined offset with respect to the second dimension of the address of the block.

18. A method according to claim 17, comprising redefining the window (20, 22), moving the position of the window in the array so that part of the locations of the moved window (22) coincide with locations of the original window (20), replacing, in the memory banks (720), data values for locations that do not belong to the moved window (22) by data values for location that belong to the moved window (22) but not to the original window (20), so that a starting address of data values for the window (20, 22) rolls through memory banks (72) in the line units (720) as the window (20, 22) is successively displaced;

maintaining information that is indicative of a line unit (72) and/or memory bank (720) wherein a data value for a location at a predetermined relative position with respect to the defined window (70, 72) is stored.

19. A data processing apparatus for processing a multi-dimensional array of data values, the array extending in a first and second dimension, the apparatus comprising a plurality of line units (72), each line unit comprising a respective plurality of S memory banks (720), each memory bank (720) having addressable locations, each location for storing a plurality of G data values;

a cache management unit (70), arranged to write data values from the array into the memory banks (720) of the line units (72), data values for locations along respective lines that extend along the first direction in the array, or for respective interleaved sets of such lines, being written into respective line units (72), respective addressable locations of the memory banks (720) each storing data values for a respective group of G successive locations along the lines, successive groups being distributed in circularly repeating fashion over the memory banks (720) in the line unit (72) that stores data values for the line to which the groups belong, the cache management unit (70) being arranged to maintain data values for a sliding window (20, 22) of locations in the array, data values for obsolete locations that drop out of the window (20, 22) upon movement of the window (20, 22) being replaced in the memory banks (720) by new data values in the window (20, 22) from a same line, or interleaved set of lines, as the obsolete locations;

a retrieval circuit (70, 74) coupled to the line units (72), the retrieval circuit (70) having an address input (71) for receiving an address of a block of locations in the array, and outputs (76) for outputting data values for locations in the block in parallel, the block containing line segments that each contain W successive locations along the first dimension, wherein W is smaller than a product G*S, the address of the block having intra-group resolution, the retrieval unit (70, 74) being arranged to retrieve data values from the block for respective ones of the line segments from a plurality of line units (72) in parallel and for respective groups that contain at least one location from the line segments from memory banks (720) in the line units (72) in parallel, the retrieval unit (70, 74) being arranged to output the retrieved data values in parallel, selecting, in the case that the locations of a particular group partly overlap with the block, a subset of data values within that particular group for output.

20. A data processing apparatus according to claim 19, wherein the retrieval circuit (70, 74) comprises a switching circuit (74) that is arranged to route data values for locations at respective predetermined positions relative to the block to predetermined respective ones of the outputs (76), an addressing unit (70) with a block address input coupled to the address input (71) of the retrieval circuit (70, 74), with address outputs coupled to the line units (72) and control outputs coupled to the switching circuit (74), the addressing unit (70) maintaining information that represents a circular offset of a memory address where a data value for a predetermined position in the window is stored, the addressing unit (70) being arranged to supply addresses to the memory banks (720) selected dependent on said information and on a relative position of the addressed block with respect to the predetermined position.

* * * * *